United States Patent
Wade et al.

(10) Patent No.: US 11,558,389 B2
(45) Date of Patent: Jan. 17, 2023

(54) CYBERSECURITY HARDENING FOR NETWORKED SYSTEMS

(71) Applicant: Honeywell International Inc., Morris Plains, NJ (US)

(72) Inventors: Edwin Wade, Morris Plains, NJ (US); Swetha Ramashayam Reddy, Morris Plains, NJ (US); Khalid Hameed Zubairi, Dubai (AE)

(73) Assignee: Honeywell International Inc., Charlotte, NC (US)

(*) Notice: Subject to any disclaimer, the term of this patent is extended or adjusted under 35 U.S.C. 154(b) by 160 days.

(21) Appl. No.: 16/836,172

(22) Filed: Mar. 31, 2020

(65) Prior Publication Data

US 2021/0306340 A1 Sep. 30, 2021

(51) Int. Cl.
| | |
|---|---|
| *H04L 29/06* | (2006.01) |
| *H04L 9/40* | (2022.01) |
| *G05B 19/042* | (2006.01) |
| *H04L 41/0893* | (2022.01) |
| *H04L 41/0816* | (2022.01) |
| *H04L 41/0823* | (2022.01) |

(52) U.S. Cl.
CPC ........ *H04L 63/102* (2013.01); *G05B 19/0428* (2013.01); *H04L 41/0816* (2013.01); *H04L 41/0836* (2013.01); *H04L 41/0893* (2013.01); *H04L 63/20* (2013.01)

(58) Field of Classification Search
CPC ............... H04L 63/102; H04L 41/0816; H04L 41/0836; H04L 41/0893; H04L 63/20; H04L 41/0866; G05B 19/0428
See application file for complete search history.

(56) References Cited

U.S. PATENT DOCUMENTS 9,124,638 B1 * 9/2015 Martini ................ H04L 9/0825
11,153,160 B1 * 10/2021 Davis .................. H04L 41/0813
(Continued)

OTHER PUBLICATIONS

Evans, Brian, "How to Build a System Hardening Program From the Ground Up," https://securityintelligence.com/how-to-build-a-system-hardening-program-from-the-ground-up/, Jan. 29, 2019, pp. 1-9, IBM/www.securityintelligence.com, USA.

*Primary Examiner* — Gil H. Lee
*Assistant Examiner* — Juan C Turriate Gastulo
(74) *Attorney, Agent, or Firm* — Bookoff McAndrews PLLC

(57) ABSTRACT

A computer-readable medium contains cybersecurity configuration settings (CCS) generating file(s) including instructions when executed cause a processor of a computer located at a node in a networked system having computers including at least one computer system class to generate CCS. The CCS generating file includes group policy objects (GPOs) applicable to all computers, policy setting scripts that are applicable to <all the computer s, and group policy definition files which provide a policy setting library for the computer class. Execution of the CCS generating file at the node automatically generates the CCS for cybersecurity protection of the node. The computer class can include computer classes that include ≥2 different operating systems, and there can be a CCS generating file for each computer class. The CCS generating file can be a single multi-class CCS generating file that includes a plurality of CCS generating files.

20 Claims, 3 Drawing Sheets

(56) References Cited

U.S. PATENT DOCUMENTS

| | | | |
|---|---|---|---|
| 2006/0190985 A1* | 8/2006 | Vasishth | G06F 21/62 |
| | | | 726/1 |
| 2009/0063584 A1* | 3/2009 | Abzarian | G06F 8/71 |
| 2015/0215339 A1* | 7/2015 | Chernoguzov | H04L 63/105 |
| | | | 726/1 |
| 2020/0084105 A1* | 3/2020 | Hajost | H04L 41/0893 |
| 2020/0220902 A1* | 7/2020 | Schlotman, Jr. | H04L 41/0266 |
| 2021/0194929 A1* | 6/2021 | Garrett | H04L 63/20 |

* cited by examiner

CYBERSECURITY HARDENING FOR NETWORKED SYSTEMS

FIELD

Disclosed embodiments relate to cybersecurity for networked systems.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize computers and network devices obtained commercially that have out-of-box cybersecurity configurations comprising a plurality of cybersecurity settings renders them vulnerable to cyberattacks. Conventionally, individual cybersecurity project implementation teams design a cybersecurity solution (a set or grouping of cybersecurity settings), where the result from each cybersecurity project is unique. This means a unique solution to each cybersecurity hardening project is dependent on the particular engineering team assigned to the project (i.e. 2 different engineers produce 2 different cybersecurity solutions). This is recognized to create ineffective cybersecurity solutions, as well as issues with technical support of the cybersecurity solution.

Disclosed aspects provide a plurality of cybersecurity configuration settings (CCS), generating files. Each CCS generating file comprises policy setting scripts and group policy objects (GPOs). There is one CCS generating file for each of the plurality of computer system classes (computer classes) for computers present in the networked system, where the computer classes are generally defined by at least their operating system (OS), such as one or more WINDOWS OS. Scripts are known to be a special type of file, such as Microsoft POWERSHELL scripts. The GPOs are applicable to all the computer classes in the computer network. The CCS generating file(s) is configured for when executed automatically generating a plurality of CCS.

A cybersecurity hardening benchmark, such as made publicly available by the Center for Internet Security (CIS), can be used to provide initial CCS including GPO settings for each a plurality of different OS as a starting point for the CCS generated by executing a disclosed CCS generating file(s). As described below, the disclosed CCS are substantially different from what is provided by the initial CCS. Moreover, CIS does not disclose or suggest any policy setting scripts or provide any suggestion for script creation. Collectively, there are multiple CCS, where the respective CCS can be uniquely applicable to a single computer class (e.g., applicable to only one OS), can have limited computer class applicability (e.g., some CCS may be applicable to only 1 or 2 of the OS), and some CCS can be universally applicable to all computer classes (e.g., some CCS applicable to all of the OS in the networked system).

The multiple CCS generating files are for providing a disclosed cybersecurity solution which generally covers a plurality of computer classes, where the respective CCS generating files can be combined into a single multi-class CCS generating file (e.g., by zipping) of the respective CCS generating files. Each CCS generating file includes GPOs which are globally applicable to all computer classes along with their associated policy definition files (e.g., .admx files), and scripts for the respective computer classes. Disclosed CCS generating files can generally be applied to computing devices running on any supported OS to provide a consistent methodology for deploying CCS in a networked system environment. Due to the standardized CCS provided there is consistency in cybersecurity solution results reflected in the respective CCS obtained between engineers using disclosed aspects, thus providing a more comprehensive and consistent cybersecurity solution that is generally not dependent on the particular cybersecurity project team implementing the cybersecurity solution in the networked system.

One disclosed embodiment comprises a method of security hardening for a networked system comprising at least one client site including a plurality of computers that collectively include at least one computer class, that are connected together by at least one communications network. The method includes obtaining at least one cybersecurity hardening benchmark (e.g., from the CIS) that includes initial CCS for the computer class(es), selecting a compatible portion from the initial CCS by determining compatibility with a process environment software currently installed on the computers, and then adding other CCS and the compatible portion to provide interim CCS. The interim CCS are tested to find compatible ones of the interim CCS and incompatible ones of the interim CCS. The incompatible interim CCS are revised to generate revised interim CCS, and the compatible interim CCS, together with the revised interim CCS are translated into a CCS generating file, with the CCS generating file including GPOs, and policy setting scripts. The CCS generating file is for when executed automatically generating a plurality of CCS.

DETAILED DESCRIPTION

Figure 1:
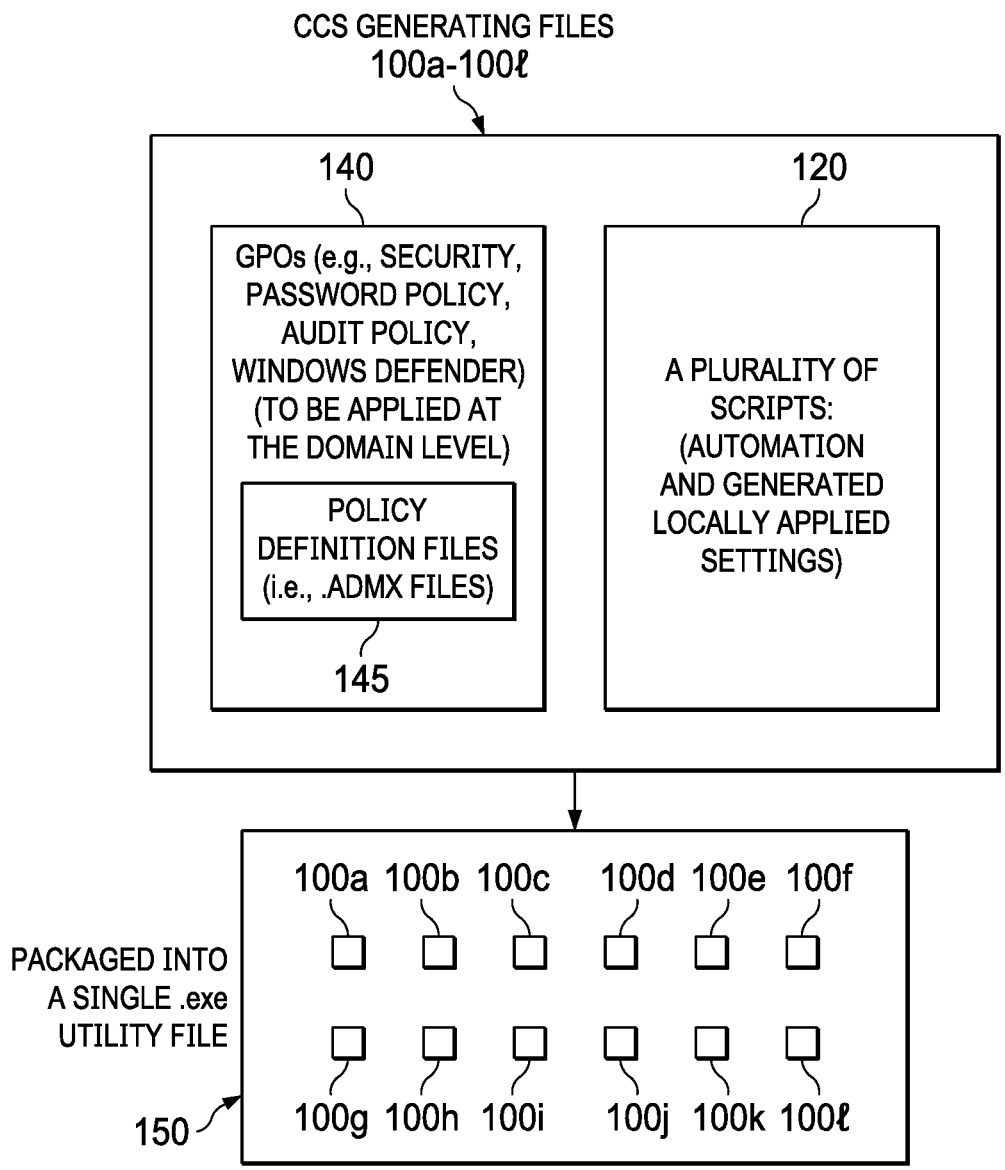
FIG. 1 is a high-level depiction showing the GPOs, policy definition files, and a plurality of scripts being the components for the CCS generating files shown, including being optionally combined into a multi-class CCS generating file, with one CCS generating file for each of the plurality of computer classes, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

Conventional network cybersecurity hardening for a networked system is known to be a process of implementation of best practices that reduce vulnerabilities for securing the networked system, such as by reducing malware introduced through a universal serial bus (USB) drive, the Internet, or through malicious emails. Vulnerabilities are generally more plentiful and present greater risk when the networked system performs more functions. Reducing available paths of a cyberattack on the network typically includes changing default passwords, the removal of unnecessary software, removing unnecessary usernames or logins, and/or the disabling or removal of deemed unnecessary services.

An example of a networked system is a process control system (PCS), sometimes called industrial control systems (ICS), which comprises one or more levels of process controllers that comprise computers, and below the controllers there are network devices including input/output (I/O) devices, as well as field devices (sensors and actuators), and then processing equipment. A variety of PCS exist, including supervisory control and data acquisition (SCADA), programmable logic controllers (PLC), or DCS, and they work to gather and transmit data obtained during the manufacturing process. The PCS can be relatively simple comprising a sensor, often called a primary transducer, that receives an input, along with a controller that processes the input, and a receiver that processes an output. The computers and network devices obtained commercially may have an out-of-box cybersecurity configuration including a plurality of CCS.

An example method of automating the cybersecurity configuration for a networked system using disclosed CCS generating files generally includes:

1) An initial system inventory step that can be run automatically to provide information for engineering. The system inventory data is not put into disclosed CCS generating files. This step can be considered network system self-awareness by obtaining an inventory of the respective computers in the networked system and their OS. This system inventory step determines what OS's the CCS generating file(s) is to be run on, or if any of the computers in the network system has special cybersecurity requirements, such in the case a computer in the network is a domain controller (DC, also known as a domain server). The inventory of the computers and the network can be collected in one example method using a single POWERSHELL command. WINDOWS POWERSHELL is known to be a command-line shell and scripting language designed especially for system administration. WINDOWS PowerShell commands, called cmdlets, allows one to manage the computers from the command line to enable performing an automated setup of the organizational units (OUs), import of the policies, OU link assignment, and policy priority order. A customer or a system administrator can run PowerShell scripts that generate and report an inventory of the computers in the network and their respective OS.

2) Running a disclosed multi-class CCS generating file or its respective CCS generating files. The running comprises the scripts being kicked off that initially perform prerequisite checks. For example, active directory user accounts with old passwords may become disabled, which are automatically checked before applying the CCS generating file to the respective nodes in the networked system.

3) Importing of the GPOs and policy definitions (i.e. supporting .admx files), where the GPOs and policy definitions (e.g., supporting .admx files) are typically generated by engineering starting with the respective CCS provided by CIS or another cybersecurity benchmark, and then making modifications.

4) Application of locally applied CCS (generally at least one different CCS per OS) which are not centrally administered, where as noted above GPOs are centrally administrated. Examples of locally applied CCS include disabling of services, and modification of user permission settings.

An additional disclosed feature is an automatic compliance checker that can be provided as a service (SaaS) offering, which can be stand-alone product, or can be licensed from a data center, to enable an individual, for example a network administrator, to continuously monitor the networked system to determine whether the CCS at a time after installation have been/are maintained. In conventional art, the cybersecurity hardening occurs only once at each site, and then there is no way to ensure that the cybersecurity hardening that was implemented is being maintained.

FIG. 1 is a high-level depiction of the GPOs 140, policy definition files 145, and a plurality of scripts 120 as the components for at least one CCS generating file shown as CCS generating files 100$a$-100$l$, that are shown optionally combined into a multi-class CCS generating file 150. Scripts and GPOs directly contain respective CCS. CCS may be automatically applied by the running of the scripts 120, so that in this way the scripts 120 contain CCS. GPOs also contain CCS, so that if a GPO is modified, different CCS will be applied to the system. The policy definition files 145 are enablers for the GPOs 140. Scripts 120 thus automate the act of applying or delivering a plurality of CCS, so that they are deployed onto the networked system in a consistent and predictable format across all engineering teams and systems.

There is a CCS generating file 100$a$-100$l$ for each of the plurality of computer classes. The multi-class CCS generating file 150 or its plurality of CCS generating files 100$a$-100$l$ components, creates a relatively simple way to generate a cybersecurity hardening design across a diverse computer system having a plurality of OS which is common in operation technology (OT) spaces. The scripts can comprise Microsoft POWERSHELL scripts. The plurality of scripts 120 can be organized by OS, and by common functions such as writing log entries, or a library function to disable a service, for providing easier maintenance by a cybersecurity development team.

The GPOs 140 may also be called group policy configuration artifacts, and are generally defined at the DC level, which enables these same set of GPOs to be applied across some or all computers in the networked system, and some or all computer classes. GPOs 140 can comprise as shown in FIG. 1 being security, password policy, audit policy, and WINDOWS DEFENDER or other cybersecurity policies. As noted above, for the GPOs 140 there are policy definition files 145 which are enablers for the GPOs 140, such as .admx files, that provide policy definitions.

A feature of disclosed CCS generating files is that there is no need for installing of new software to execute disclosed CCS generating file(s). Basic static log files (which are generated by the scripts 120 shown in FIG. 1), support libraries (i.e., the policy definition files 145 such as .admx files), and the resulting respective CCS, such as in one example being the passwords needing to be fourteen or more characters, themselves being the only changes made on a computer. No new software needs to be registered on the networked system.

Prior cybersecurity projects required an estimated approximately four to six weeks per project for the cybersecurity design effort, with a significant variance across cybersecurity projects. The disclosed CCS generating file(s) can be a centrally maintained solution that significantly simplifies the cybersecurity solution design effort because of being provided in a standard and reusable format, particularly when the CCS generating files are combined into a single multi-class CCS generating file 150.

Figure 2:
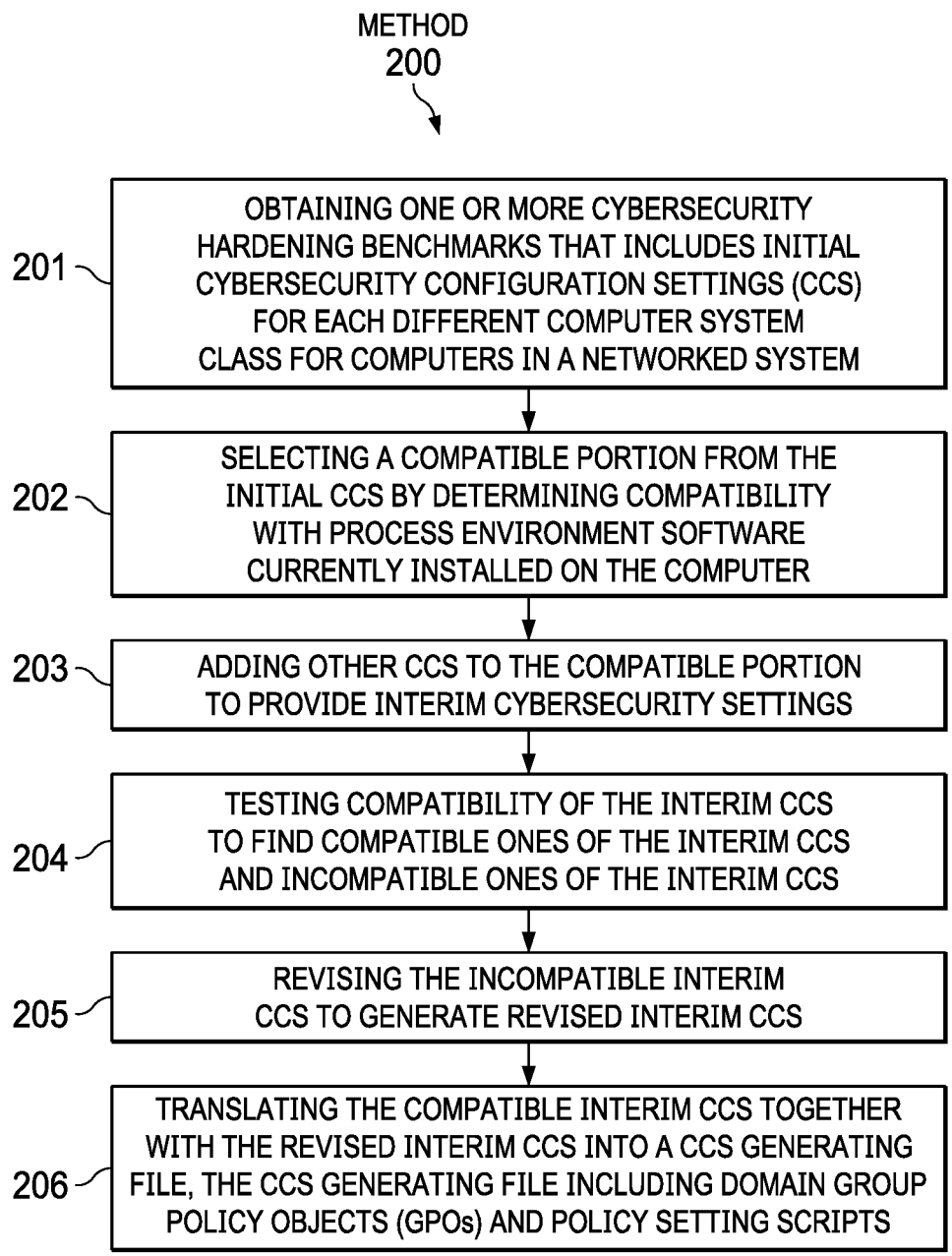
FIG. 2 is a flow chart that shows steps in an example method of cybersecurity hardening for computers in a networked system comprising at least one client site using disclosed CCS generating files, according to an example embodiment.

FIG. 2 is a flow chart that shows steps in a method 200 of security hardening for a networked system comprising a plurality of computers located at one or more client sites, according to an example embodiment. The client site generally includes one or more different physical locations, but can also include two or more DCSs in the same physical location. The client site includes network connected computers connected together by at least one communications network (ETHERNET, or could be a wireless network) that comprises a plurality of computers including one or more computer classes. As noted above, the computer class is based on at least the OS run by the respective computers in the networked system, such as when running WINDOWS OS, for example two computer classes when the computers are running Windows 7 OS and Windows 10 OS. The classes may also optionally be extended to an application class, e.g. a DCS server, or operator station computer. There is generally also at least one of the computers in the networked system configured as a DC, such as shown as the domain controller 323 shown in the DCS 360 in FIG. 3 described below.

In the case the plurality of computers further comprise different computer system application classes, there can be another source of classes enabled by additional GPOs to customize the plurality of CCS between the different computer system application classes. A GPO fileset can address devices in a different class definition (e.g. attended vs. un-attended operator stations) which may have the same software, such as for WINDOWS 7 or 10 OS, or the same DCS software, installed, but may be handled differently for cybersecurity. Moreover, multiple OSs which may be subject to administration by the same GPO fileset. For example, there may be two operator stations which are the same OS and have the same cybersecurity software, however the operator station 1 may be a 24/7 (continually operating) manned control room, and operator station 2 may be out in a more public area. The control room station should generally never lock the screen. However, the public operator station may need additional cybersecurity to protect from unauthorized people in the area.

Step 201 comprises obtaining one or more cybersecurity hardening benchmarks that includes initial CCS (or rules) for each of the different classes for computers in a networked system. This obtaining hardening benchmark step can comprise downloading from the Internet, or providing the hardening benchmark on a disk, such as initial CCS made available by the CIS.

Step 202 comprises selecting a compatible portion from the initial CCS, generally for each of the plurality of different classes present in the networked system, by determining compatibility with process environment software currently installed on the computer systems. The computers have purpose-built software installed, referred to herein as process environment software, which can comprise process control software that is the functional reason the computer systems are placed in a plant or other client facility. For one specific process environment software example, the software currently installed for a PCS can be Honeywell International EXPERION (Process Knowledge System) software.

Step 203 comprises adding other CCS to the compatible portion to provide interim CCS, generally for each of the plurality of different classes present. Some added CCS can be obtained from changes to the CCS in the cybersecurity hardening benchmark e.g., based on a password policy, and also some CCS can be new CCS.

Step 204 comprises testing compatibility of the interim CCS to find compatible ones of the interim CCS and incompatible ones of the interim CCS. Compatibility testing can be performed on a testbed comprised of a company's process environment software, such as Honeywell International EXPERION software. In the case of Honeywell International software, test teams can execute the features of the Honeywell International software to confirm norm al and expected operations. If abnormal operation is detected, it can be reported and design decisions made on how to handle the situation (e.g. omit security feature, report the issue to an application team, and/or audit but do not block the security related action). The testing can also comprise testing the software on the various supported OSs (WINDOWS 7, 2016, 2008R2, etc.).

Step 205 comprises revising the incompatible interim CCS to generate revised interim CCS. Step 206 comprises translating the compatible interim CCS together with the revised interim CCS into a CCS generating file, the CCS generating file including GPOs and policy setting scripts. The CCS generating file when executed is for automatically generating a plurality of CCS.

The method can further include collecting cybersecurity data from the client site including existing group cybersecurity policies comprising existing GPOs and information describing the domain structure, which are both relevant to understanding the existing GPO design, as well as an overall inventory of the networked system comprising a number and identity of the computer classes (e.g., five WINDOWS 7 computers and twelve WINDOWS 10 computers). An engineer, or software, can then analyze the cybersecurity data by comparing the existing GPOs with the GPOs in the CCS generating files(s) to identify incompatibilities (or conflict), such as using tools such as the Microsoft POLICY ANALYZER, wherein the case of an incompatibility an engineering design decision is made. The design decision to resolve incompatibilities may also be made by specialized software. The CCS generating file(s) can then be installed on a first of the plurality of computers in the network, generally being first installed on the DC. The method can also comprise responsive to the incompatibility, adding an additional GPO before the installing to respond to each of the incompatibilities.

The method can further comprise automatically monitoring the networked system on demand or at regular predetermined time intervals to determine whether any of the plurality of CCS deployed by the CCS generating files are still in compliance and have not been changed. In accordance with a determination that at least one of the plurality of CCS is an affected CCS that is not in compliance, providing an alert, and/or acting to remediate the affected CCS. The method can further comprise when the plurality of computers include a DC, implementing one of the CCS generating files corresponding to the DC before the installing proceeds to any of the other computers in the networked system.

This installation process allows for optional phased CCS deployment. For example, consider a running networked system would have the CCS applied one node at a time instead of 'shocking' the entire system all at once. Upon deployment on the DC, functionally significant policies are generally not immediately applied systemwide in the networked system, where the engineer deliberately applies changes to each node in the networked system, who may do so as fast or slow as deemed appropriate. Policies which do not contain significant modifications can be applied automatically and can become effective essentially immediately.

The method can also comprise running an automated reporting tool (e.g., using a report generating tool published and provided by CIS) to automatically generate a compliance report including identification of the incompatible interim CCS. This can provide the reporting tool as a consulting tool to a company, and company produced custom cybersecurity configurations which defines the CCS that are being inspected by this standard tool. The CCS can be custom aligned with that of a disclosed single multi-class file CCS generating file. If using an automated reporting tool without the benefit of disclosed aspects, a customer may receive an 80% compliance rating and then needs to manually review the deviations. When using an automated reporting tool with disclosed CCS file(s), the customer may receive a 100% compliance thus enabling the bypassing of an analysis to resolve the deviations. One may run this compliance report both before and after disclosed cybersecurity hardening to generate a compliance percentage both before and after compliance reports.

Figure 3:
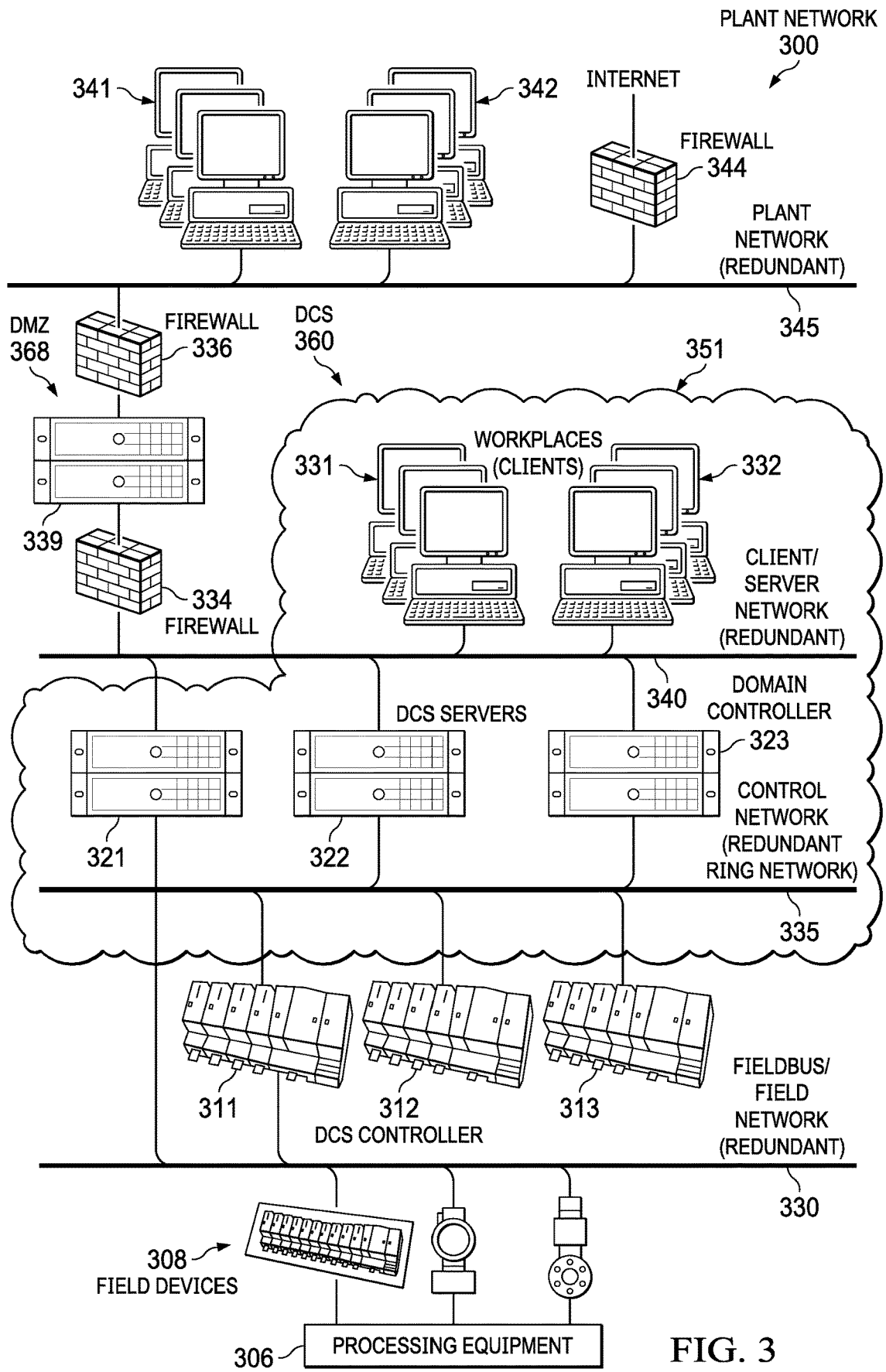
FIG. 3 shows an example plant network including a distributed control system (DCS) that includes network(s) with computers that can implement disclosed aspects.

FIG. 3 shows an example plant network 300 including a DCS 360 that includes a plurality of networks each including computers that can each implement disclosed aspects. System communication can be based on Ethernet and Transmission Control Protocol/Internet Protocol (TCP/IP) networks, which are functionally and, in most cases, also physically built in levels. FIG. 3 also shows the different levels in the plant network 300. The plant network 300 is separated into different redundant network areas on different levels, shown as the fieldbus/field network 330, the control network 335, the client/server network 340, and a plant network 345.

As shown in FIG. 3, there is a boundary 351 depicted as a cloud which indicates which computers in the DCS 360 that would at a minimum generally be hardened by a disclosed cybersecurity solution. The computers within the boundary 351 comprise DCS servers 321, 322 and 323, where server 323 is identified as being the domain controller (DC). There is generally at least one DC (also known as a domain server) in the network. Within the boundary 351 is also workstations shown as 331 and 332. The DCS servers 321-323 are coupled to the workstations 331, 332 by a client/server network 340, such as comprising an Ethernet network.

The DCS 360 on its lowest level is shown including field devices 308 (such as sensors and actuators) that are coupled to processing equipment shown as 306. There are also a plurality of DCS controllers shown as 311, 312, and 313. The DCS controllers 311-313 are coupled to the DCS servers 321-323 by a network 335 that may also comprise an Ethernet network.

Besides the workstations 331, 332 in the demilitarized zone (DMZ) 368 shown, there are also firewalls 334 and 336, and another server 339. There is also shown client computers 341 and 342 that are coupled by a plant network 345 to the firewall 336. There is also a firewall 344 shown coupling the plant network 345 to the Internet.

The cybersecurity solution may be extended beyond the boundary 351, such as to also apply to computer systems in the DMZ 368. By cybersecurity hardening within the boundary 351 including the DCS servers 321 to 323, certain cybersecurity protections are extended to the lower levels since the DCS servers 321-323 interact directly with the DCS controllers 311-313. A cybersecurity compromised DCS server 321-323 puts the DCS controllers 311-313 and the field devices 308 directly at risk, and by extension cyberprotecting the DCS servers 321-323 also provides protections to DCS controllers 311-313.

In FIG. 3, the cloud depicting the bounds of the boundary 351 indicates which computer systems in one arrangement may be cybersecurity hardened by a disclosed cybersecurity solution. The cybersecurity solution may be extended to devices beyond the boundary 351, such as to also apply to computers in the DMZ 368. By cybersecurity hardening within the boundary 351 shown applied to the DCS servers 321-323, certain protections are extended to the lower levels (i.e. control network 335, etc.) since the DCS equipment interacts directly with the control devices/PLCs. This is because as noted above a compromised DCS server puts the DCS controllers 311-313 and field devices 308 directly at risk.

Disclosed aspects can be applied to generally to a variety of network systems. For example, application may be made to a PCS, such as being configured as a DCS. A DCS is a computerized control system for a plant that generally includes a plurality of control loops, in which autonomous controllers are distributed throughout the system, but there is no central operator supervisory control. This is in contrast to systems that use centralized controllers; either discrete controllers located at a central control room or within a central computer. The DCS concept increases reliability and reduces installation costs by localizing control functions near the process plant, with remote monitoring and supervision.

The PCS can run an industrial process involving a tangible material. For example, oil and gas, chemical, beverage, pharmaceutical, pulp and paper manufacturing, petroleum processes, electrical, and water. An industrial process which involves a tangible material is distinct from data processing that only performs data manipulations. The individual elements such as controllers, computers, and network devices in the DCS communicate with a centralized computer through the plant's local area network, commonly referred to as a control network.

Based on disclosed aspects, although a cybersecurity hardening solution is described for computer systems, a related cybersecurity hardening solution can also be devised for network devices in the networked system, such as for switches, routers, or firewalls. A hardening solution in the case of network devices in a networked system may enhance cybersecurity by disabling unused features, selecting more secure options, disabling unused physical aspects such as interfaces, and modification of other settings which improve the security of the network device. In similar fashion, disclosed aspects may also be extended to other hardware modules such as process controllers or process control hardware by auditing for insecure configurations such as those related to accessibility, control permissions, programmability access configuration, insecure default settings, communication protocol related settings, or other settings which can in any way impact the cybersecurity of the device, and identifying settings which increase the security of the device. The process can be configured to also run a CIS tool using custom benchmarks, then remediating a first network device. This procedure can then be repeated for other network devices and for the networked system. For devices where an existing auditing tool does not exist, a similar auditing tool as described above may be created.

EXAMPLES

Disclosed embodiments are further illustrated by the following specific examples, which should not be construed as limiting the scope or content of this Disclosure in any way.

An Example General Deployment:

The CCS generating file(s) is intended to be deployed on all nodes in the networked system which are to be cybersecurity hardened. It is recommended to start the execution process with the DC(s) which are known to have the most significant effect on the system with regard to cybersecurity hardening, and then deploy hardening to each other node independently. This creates a natural opportunity to interact with and resolve issues with each node as policies are being been applied by disclosed CCS generating files. The CCS generating file(s) has the following major components listed below which are selectively deployed during the installation process based on the local system detected.

1) Policy definition files (e.g., an .admx file library). The policy definition files provide the policy setting library for the various operating systems, features, settings and other configuration options made available in the Group Policy Management Console (GPMC). These policy definition files define the link, for example, between the group policy metadata displayed in GPMC and specific registry entries that enact the change. This component is generally deployed only to the DC and is typically placed in a central repository.

2) GPO library which generally applies only to the DC(s). These are the specific setting definitions containing the hardened CCS. New policies are to be created on the DC, and the CCS will be imported from this backup repository. Scripts are for first creating the GPOs and then importing the CCS into those GPOs. Once GPOs containing CCS are created, the policies are to be linked to specific OUs in order to be applied to the proper domain user and computer objects.

3) Scripts which define and automate application of CCS to all nodes in the networked system, apply a local hardening configuration. Local CCS, such as comprising the disabling of unused/unwanted services, and specific user access settings are set using local policy setting script(s). These CCS are intended be installed/applied to all nodes in the network.

An Example Specific Deployment:

An oil refinery has 8 main process areas, each process area of the plant including a PCS comprising of a redundant pair of DCS servers, numerous operator stations, and a common DC. Shared among these areas on a common network is the common DC, a data historian, and a server as an anti-virus server. A security engineer provides a cybersecurity design plan to remediate the full plant, 1 area at a time including an orderly plan for deployment within each area while the plant is running.

The engineer will first deploy disclosed CCS generating files on the common DC, thus making the policies available to all nodes across all process areas of the oil refinery. It may also be possible for deployments to be performed automatically. The engineer, or software, will then follow the design plan to apply the respective CCS to a DCS secondary server with process area 1. This involves assigning the policies centrally stored at the common DC, and also running the CCS generating file locally on the DCS secondary server. The DCS secondary server is now configured and may be evaluated as appropriate.

The engineer may then proceed to harden the other servers in the environment and the operator stations using the same steps described previously, applying policies located centrally at the common DC, followed by running the CCS generating files on each computer. After all computers in area 1 are complete, area 1 will be tested and signed off by the engineer. At this point, the engineer will continue by repeating the same process at the remaining process areas until the entire site has had the CCS generating files applied to provide CCS to each node, thus providing the oil refinery with enhanced cybersecurity.

In disclosed network hardening, one can first run a CIS automated reporting tool with disclosed customized CCS to create a compliance report, where existing security settings in devices in the network are identified that do not meet the disclosed CCS standards. Based on the reports, all the setting fails identified in the report should generally be remediated by putting the correct security configuration in place.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. As described above, based on disclosed aspects, although a cybersecurity hardening solution is described for computer systems, a related hardening solution can also be devised for network devices in the networked system, such as IO modules or network switches.

In addition, while a particular feature may have been disclosed with respect to only one of several implementations, such feature may be combined with one or more other features of the other implementations as may be desired and advantageous for any given or particular application.

The invention claimed is:

1. A method of security hardening for a networked system comprising at least one client site including a plurality of computers including at least one computer class connected together by at least one communications network, comprising:

obtaining one or more cybersecurity hardening benchmarks that includes an initial cybersecurity configuration settings (CCS) for the computer class;

selecting a compatible portion from the initial CCS by determining compatibility with process environment software currently installed on the plurality of computers;

adding a new CCS and the compatible portion to provide an interim CCS, wherein the new CCS is obtained by making changes to the initial CCS in the cybersecurity hardening benchmarks;

testing compatibility of the interim CCS to find at least one of a compatible interim CCS and an incompatible interim CCS;

revising the incompatible interim CCS to generate a revised interim CCS; and translating the compatible interim CCS with the revised interim CCS into a CCS generating file, the CCS generating file including a group policy objects (GPOs) and a policy setting scripts for automatically generating a plurality of CCS.

2. The method of claim 1, wherein the computer class comprises a plurality of different ones of the computer classes that collectively include at least two different operating systems (OSs), wherein each computer class comprises the CCS generating file, wherein the CCS generating file is a single multi-class CCS generating file.

3. The method of claim 1, wherein the GPOs are applicable for all of the computer classes, and wherein the policy setting scripts are applicable for at least one of the computer classes, but not all of the computer classes.

4. The method of claim 1, wherein the plurality of computers further comprises different computer system application classes, and wherein there are additional ones of the GPOs to customize the plurality of CCS between the different computer system application classes.

5. The method of claim 1, wherein the networked system is a process control system.

6. The method of claim 1, wherein the at least one client site comprises a plurality of client sites including two or more physical locations.

7. The method of claim 2, wherein the CCS generating files are organized by an OS.

8. The method of claim 1, further comprising:
collecting cybersecurity data from the client site including existing group cybersecurity policies comprising existing GPOs and information describing a domain structure, and an overall inventory of the networked system comprising a number of computer classes;
analyzing the cybersecurity data by comparing the existing GPO's with the GPOs in the CCS generating file to identify incompatibilities;
resolving the incompatibilities; and
installing the CCS generating file on a first of the plurality of computers.

9. The method of claim 8, further comprising responsive to the incompatibilities, adding an additional GPO before the installing to respond to each of the incompatibilities.

10. The method of claim 8, further comprising:
automatically monitoring the networked system on demand or at regular, predetermined time intervals to determine whether any of the plurality of CCS deployed by the CCS generating files are still in compliance and have not been changed, and
in accordance with a determination that at least one of the plurality of CCS is an affected CCS that is not in compliance, providing an alert, or acting to remediate the affected CCS.

11. The method of claim 8, wherein the plurality of computers include a domain controller (DC), and the installing comprises implementing one of the CCS generating files corresponding to the DC before installing proceeds to any of other plurality of computers.

12. The method of claim 8, further comprising running an automated reporting tool to automatically generate a compliance report including an incompatible CCS.

13. A non-transitory computer-readable medium comprising instructions that when executed cause at least one processor to,
obtain one or more cybersecurity hardening benchmarks that includes an initial cybersecurity configuration settings (CCS) for a computer class;
select a compatible portion from the initial CCS by determining compatibility with process environment software currently installed on a plurality of computers;
add a new CCS and the compatible portion to provide an interim CCS, wherein the new CCS is obtained by making changes to the initial CCS in the cybersecurity hardening benchmarks;
test compatibility of the interim CCS to find at least one of a compatible interim CCS and an incompatible interim CCS;
revise the incompatible interim CCS to generate a revised interim CCS; and
translate the compatible interim CCS with the revised interim CCS into a CCS generating file, the CCS generating file including a group policy objects (GPOs) and a policy setting scripts for automatically generating a plurality of CCS.

14. The non-transitory computer-readable medium of claim 13, wherein the computer class comprises a plurality of different ones of the computer classes that collectively include at least two different operating systems (OS's), wherein each computer class comprises the CCS generating file, wherein the CCS generating file is a single multi-class CCS generating file.

15. The non-transitory computer-readable medium of claim 14, wherein the GPOs are applicable for all of the computer classes, and wherein the policy setting scripts are applicable for at least one of the computer classes, but not all of the computer classes.

16. The non-transitory computer-readable medium of claim 13, wherein the plurality of computers further comprises different computer system application classes, and wherein there are additional ones of the GPOs to customize the plurality of CCS between the different computer system application classes.

17. The non-transitory computer-readable medium of claim 14, wherein the CCS generating files are organized by an OS.

18. The non-transitory computer-readable medium of claim 14 comprising instructions that when executed cause at least one processor to:
collect cybersecurity data from a client site including existing group cybersecurity policies comprising existing GPOs and information describing a domain structure, and an overall inventory of a networked system comprising a number of computer classes;
analyze the cybersecurity data by comparing the existing GPO's with the GPOs in the CCS generating file to identify incompatibilities;
resolve the incompatibilities; and
install the CCS generating file on a first of the plurality of computers.

19. The non-transitory computer readable medium of claim 18 comprises adding an additional GPO before the installing to respond to each of the incompatibilities, responsive to the incompatibilities.

20. The non-transitory computer readable medium of claim 13, wherein the plurality of computers further comprises different computer system application classes, and wherein there are additional ones of the GPOs to customize the plurality of CCS between the different computer system application classes.

* * * * *